United States Patent
Erb et al.

(10) Patent No.: US 10,553,847 B2
(45) Date of Patent: Feb. 4, 2020

(54) BATTERY ASSEMBLY HAVING A SHEAR CORD AND BATTERY ACCESSING METHOD USING THE SHEAR CORD

(71) Applicant: Ford Global Technologies, LLC, Dearborn, MI (US)

(72) Inventors: Dylan Erb, Allen Park, MI (US); Alexander Bartlett, Wyandotte, MI (US); Jacob Wiles, Plymouth, MI (US); Bikram Singh, Royal Oak, MI (US); Baocheng Sun, Beverly Hills, MI (US); Nathan Kristofor Tardif, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 15/657,352

(22) Filed: Jul. 24, 2017

(65) Prior Publication Data
US 2019/0027723 A1 Jan. 24, 2019

(51) Int. Cl.
*H01M 2/10* (2006.01)
(52) U.S. Cl.
CPC ....... *H01M 2/1094* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 4,474,304 A | 10/1984 | Jacobs | |
| 5,702,015 A | 12/1997 | Giles et al. | |
| 6,007,941 A | 12/1999 | Hermann et al. | |
| 9,246,148 B2 | 1/2016 | Maguire | |
| 2011/0200871 A1* | 8/2011 | Pytlik | H01M 2/0413 429/185 |
| 2015/0079458 A1* | 3/2015 | Maguire | H01M 2/1083 429/163 |
| 2015/0133979 A1* | 5/2015 | Johnson | A61B 17/320092 606/169 |
| 2015/0194645 A1* | 7/2015 | Ferber | H01M 2/105 429/100 |

* cited by examiner

*Primary Examiner* — Christopher P Domone
(74) *Attorney, Agent, or Firm* — David Kelley; Carlson, Gaskey & Olds, P.C.

(57) ABSTRACT

An exemplary battery assembly includes an enclosure having a first portion interfacing with a separate, second portion along an interface. A seal is at the interface, and a shear cord is configured to rupture the seal when moved from a first position to a second position. An exemplary battery accessing method includes moving a shear cord from a first to a second position to rupture a seal. The seal is at an interface between a first and a second portion of an enclosure.

18 Claims, 4 Drawing Sheets

BATTERY ASSEMBLY HAVING A SHEAR CORD AND BATTERY ACCESSING METHOD USING THE SHEAR CORD

TECHNICAL FIELD

This disclosure relates generally to accessing an area within an enclosure of a battery pack. In particular, the disclosure relates to utilizing a shear cord to rupture a seal so that the area can be accessed.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is used to selectively power the electric machines and other electrical loads of the electrified vehicle. The battery pack can be mounted to a vehicle body structure, such as an underbody of the electrified vehicle. The battery pack can include an enclosure that houses multiple interconnected battery cells and other components. The battery cells store energy for powering the electrical loads. From time to time, servicing components within the enclosure may be required.

SUMMARY

A battery assembly according to an exemplary aspect of the present disclosure includes, among other things, an enclosure having a first portion interfacing with a separate, second portion along an interface. A seal is at the interface, and a shear cord is configured to rupture the seal when moved from a first position to a second position.

In a further non-limiting embodiment of the foregoing assembly, the shear cord is partially disposed within the seal.

In a further non-limiting embodiment of any of the foregoing assemblies, the seal is a curable seal that joins the first and second portions of the enclosure.

A further non-limiting embodiment of any of the foregoing assemblies includes a battery array housed within the enclosure.

In a further non-limiting embodiment of any of the foregoing assemblies, the first portion is a lid and the second portion is a tray.

In a further non-limiting embodiment of any of the foregoing assemblies, the first portion, the second portion, or both, are a metal or metal alloy.

In a further non-limiting embodiment of any of the foregoing assemblies, the shear cord extends longitudinally from a first end portion to an opposite, section end portion. The first end portion extends outside the seal to provide a pull tab.

In a further non-limiting embodiment of any of the foregoing assemblies, a longitudinal section of the shear cord is entirely embedded within the seal such that the seal extends circumferentially about an entire perimeter of the shear cord along the longitudinal section.

In a further non-limiting embodiment of any of the foregoing assemblies, the rupture is a partial rupture such that part of the seal remains secured to both the first portion and the second portion when the seal is in the second position.

In a further non-limiting embodiment of any of the foregoing assemblies, the enclosure provides an interior area, and the first portion interfaces with the second portion to close an opening to the interior area. The seal and the shear cord extend circumferentially about a perimeter of the opening.

A battery accessing method according to another exemplary aspect of the present disclosure includes, among other things, moving a shear cord from a first to a second position to rupture a seal. The seal is at an interface between a first and a second portion of an enclosure.

A further non-limiting embodiment of the foregoing method includes, prior to the moving, securing the first and the second portion together with the seal.

In a further non-limiting embodiment of any of the foregoing methods, the moving includes pulling a first portion of the shear cord that is outside the enclosure to draw a different, second portion of the shear cord through the seal to rupture the seal.

A further non-limiting embodiment of any of the foregoing methods includes holding a battery array within the enclosure.

In a further non-limiting embodiment of any of the foregoing methods, the shear cord is at least partially embedded within the seal when the shear cord is in the first position, and the shear cord is separated from the seal at the interface when the shear cord is in the second position.

A further non-limiting embodiment of any of the foregoing methods includes holding the shear cord with the seal when the shear cord is in the first position.

A further non-limiting embodiment of any of the foregoing methods includes blocking moisture from entering the interface using the seal when the shear cord is in the first position.

In a further non-limiting embodiment of any of the foregoing methods, the first portion is a lid and the second portion is a tray.

In a further non-limiting embodiment of any of the foregoing methods, the rupture is a partial rupture such that part of the seal remains secured to both the first portion and the second portion when the seal is in the second position.

In a further non-limiting embodiment of any of the foregoing methods the enclosure provides an interior area, and the first portion interfaces with the second portion to close an opening to the interior area. The seal and the shear cord extend circumferentially about a perimeter of the opening.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Servicing components of a battery pack can require accessing an interior area of a battery pack enclosure. Accessing the interior area may be required for other reasons as well.

Many battery packs include at least one seal at interfaces between portions of the battery pack enclosure. For example, the interface between a lid and a tray of the battery pack enclosure can include a seal.

The seal, among other things, can block moisture and contaminants from entering the interior area through the interfaces, and can block gases from escaping the interior area through the interfaces. The seal can also bond together the portions of the battery pack.

This disclosure relates to rupturing a seal to access the interior area of a battery pack. Notably, the seal rupturing techniques described herein do not necessarily require a bladed cutting tool, such as a knife. Such cutting tools could damage components of the battery pack. Further, cutting the seal with a bladed cutting tool can be relatively time consuming, and contacting the electrically charged components of the battery pack with the bladed cutting tool is undesireable.

Figure 1:
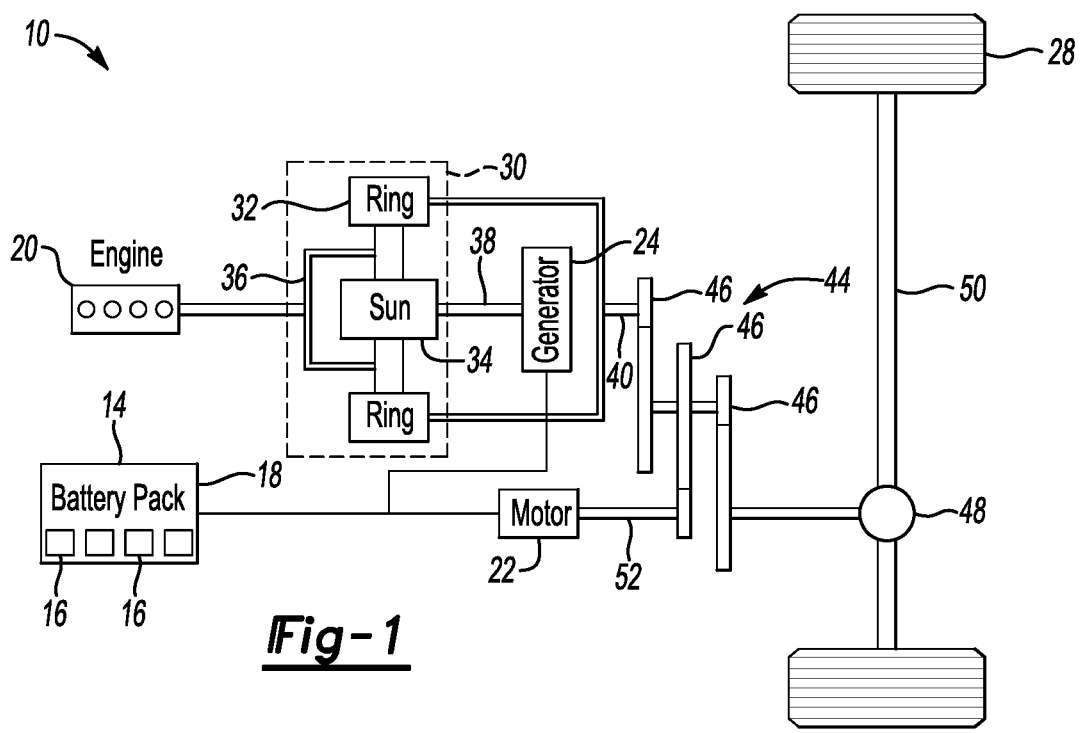
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 16 held within an enclosure 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10. Since the battery pack 14 provides selectively powers propulsion, the battery pack 14 is a traction battery pack.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
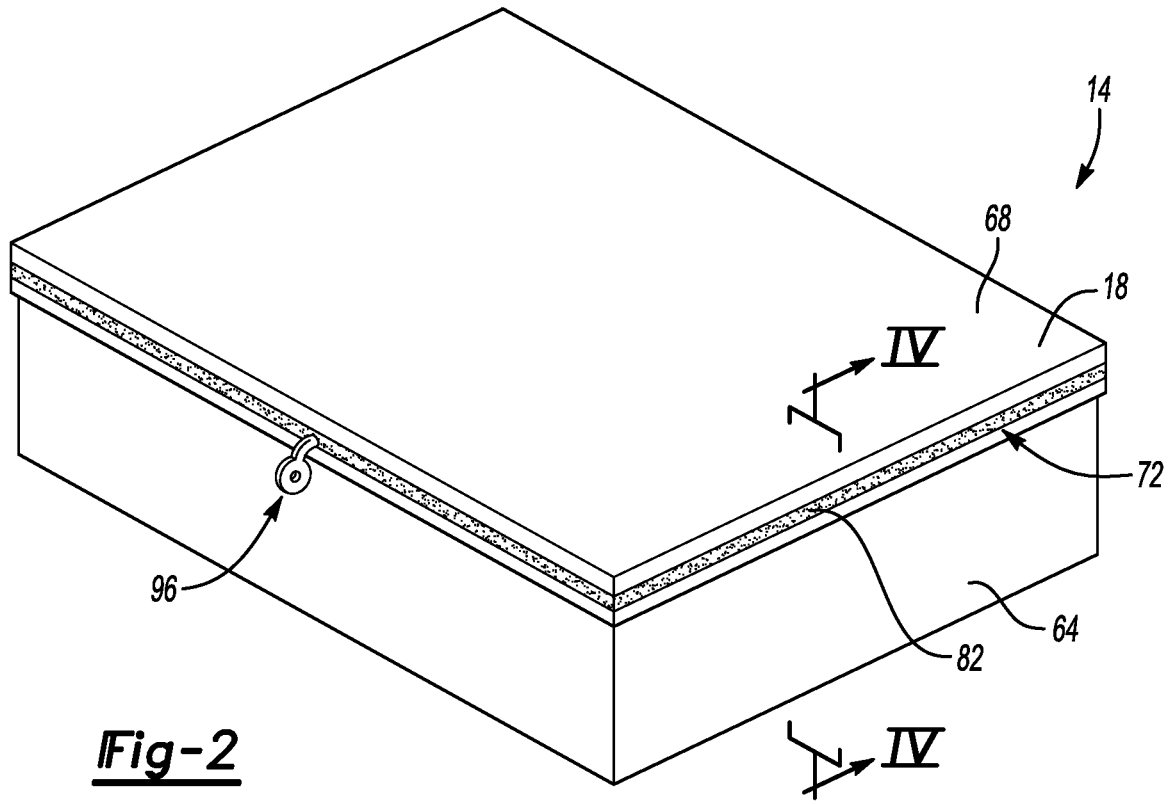
FIG. 2 illustrates a perspective view of a battery pack from the powertrain of FIG. 1.
Figure 3:
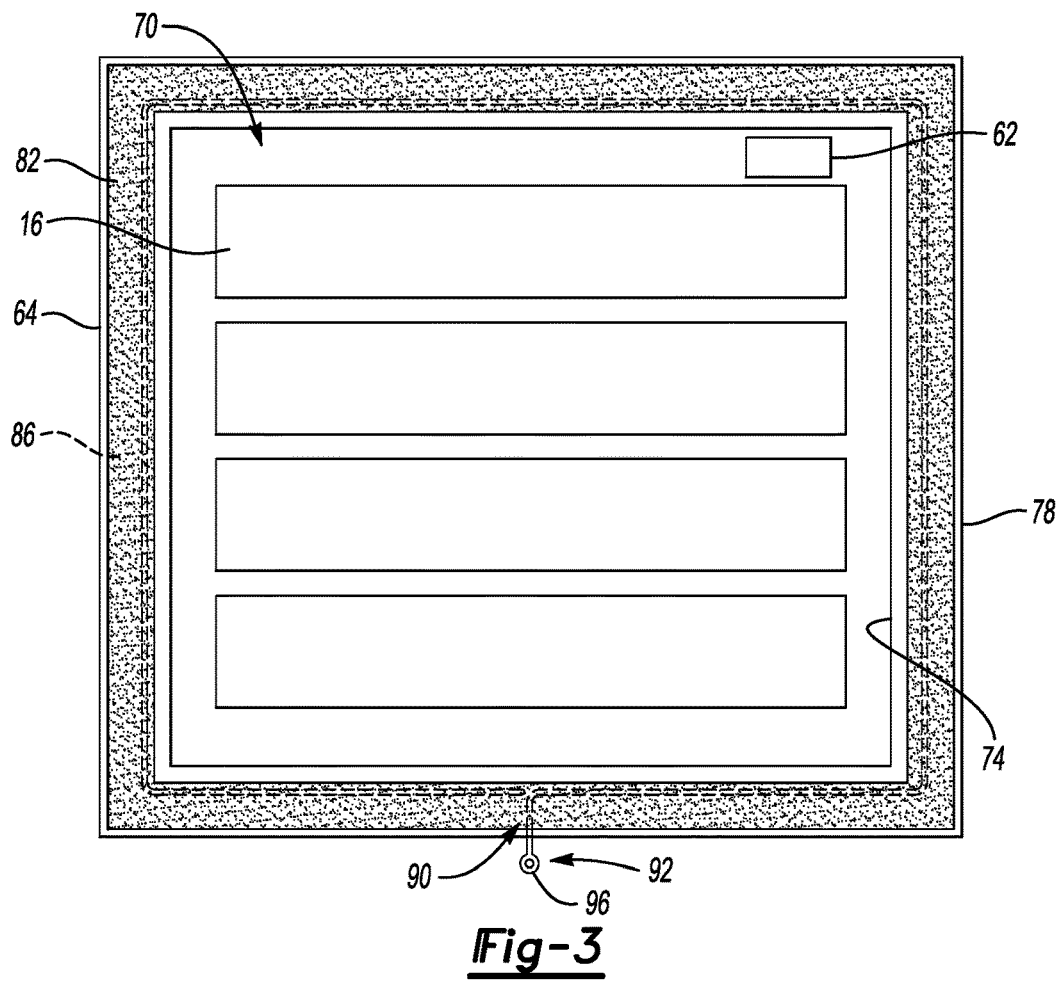
FIG. 3 illustrates the battery pack of FIG. 2 with a lid removed to reveal an interior area.
Figure 4:
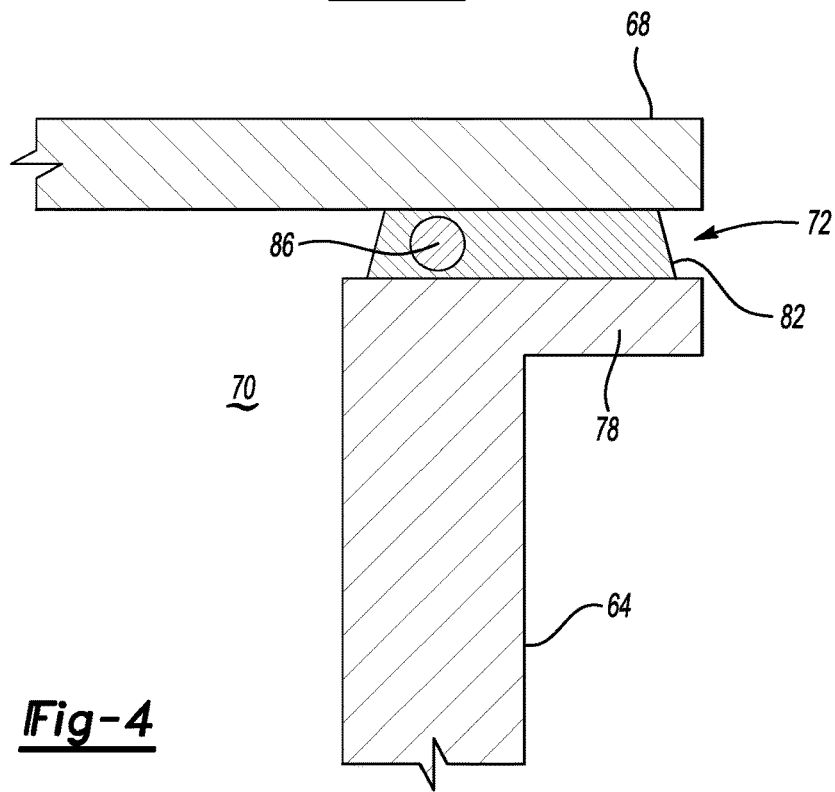
FIG. 4 illustrates a section taken along Line IV-IV in FIG. 2 that shows a sealed interface between separate portions of the enclosure.

Referring now to FIGS. 2 to 4 with continuing reference to FIG. 1, the battery pack 14 can be mounted to, for example, an underbody of a vehicle having the powertrain 10. The enclosure 18 houses the plurality of battery arrays 16 and other components 62, such as battery control modules, electrical cables, bus bar assemblies, etc.

The enclosure 18 generally includes a tray 64 and a lid 68. The battery arrays 16 and the other components 62 are held within an interior area 70 provided between the tray 64 and the lid 68.

In an example non-limiting embodiment, both the tray 64 and the lid 68 of the enclosure 18 are a metal, such as sheet metal, or a metal-alloy. In other examples, the tray 64 could be a metal or metal-alloy, such as sheet metal, and the lid 68 could be a polymer-based material, such as a sheet molding compound (SMC). In other examples, the lid 68 is a metal or metal alloy, and the tray is a polymer-based material.

Exemplary polymers for the tray 64 and the lid 68 include, for example, neat, or pure, thermoplastics. The polymers could include other types of thermoplastics and thermosets with reinforcing fibers, such as glass or carbon, or other fillers, such as talc or glass beads.

The tray 64 and the lid 68 are secured together to enclose the battery arrays 16 and the other components 62 of the battery pack 14 within the interior area 70. When secured, the tray 64 and the lid 68 meet at an interface 72. The lid 68 covers an opening 74 to the interior area 70. In this example, the example interface 72 extends continuously about a periphery of the opening 74.

The tray 64 and the lid 68 are sections of the enclosure 18 that interface with each other. In other exemplary embodiments, the enclosure 18 could include other sections that interface with each other. For example, a second type of enclosure could include separate side walls, a floor, and a lid that interface with each other to provide the second type of enclosure. The side walls, the floor, and the lid would then each be a separate section of that second type of enclosure. Further, a third type of enclosure could include a side wall with an opening that is covered by a panel. The side wall and the panel would then each be a separate section of that third type of enclosure. Accordingly, although the sections of the enclosure 18 are described as the tray 64 and the lid 68 in the exemplary embodiment of FIGS. 2 to 4, the enclosure sections could have other configurations.

The example tray 64 includes a lip 78 extending outwardly away from the interior area 70. The lip 78 increases a size of the interface 72 relative to a tray without such a lip.

In this example, the battery pack 14 includes a seal 82 at the interface 72. The seal 82 blocks moisture (i.e., water) and contaminants from moving through the interface 72 and entering the interior area 70 from outside the battery pack 14. The seal 82 can block gases from moving through the interface 72 and escaping from the interior area 70.

The exemplary seal 82 at least partially secures together the tray 64 and the lid 68. Additional elements may be utilized to secure the lid 68 to the tray 64, such as, for example mechanical fasteners. The lip 78 can provide more area for the seal 82 than a tray that lacks such a lip.

The battery pack 14 is in an assembled state when the tray 64 and the lid 68 are secured together. In the assembled state, the battery pack 14 can be utilized within the powertrain 10 of FIG. 1.

From time to time, after the battery pack 14 is in the assembled state, accessing the interior area 70 may be required. For example, the battery cells within the battery arrays 16 may require servicing, or the other components 62 could require servicing or maintenance. To access the interior area 70 after the battery pack 14 is in the assembled state, the tray 64 and the lid 68 are moved away from each other. The components 62 and the battery arrays 16 can then be accessed through the opening 74.

Moving the tray 64 and the lid 68 away from each other can involve removing any mechanical fasteners. Additionally, the seal 82 is ruptured so that the seal 82 is no longer securing the tray 64 and the lid 68 together.

To facilitate rupturing the seal 82, a shear cord 86 is positioned at or near the interface 72. The shear cord 86, in this example, extends substantially about an entire circumferential perimeter of the opening 74 when the battery pack 14 is in the assembled state.

In another example, the shear cord 86 extends only partially about the opening 74, such as along only three sides of the enclosure 18.

In still other examples, more than one of the shear cord 86 are used, and different shear cords are used in different areas of the interface 72. For example, four separate shear cords could be used, one along each side of the enclosure 18.

Generally, the shear cord 86 is positioned in areas where rupturing the seal 82 is desired. If rupturing the seal 82 on less than four of the sides, or along portions of the sides, is desired, the shear cord 86 could be included in only those areas.

Figure 5:
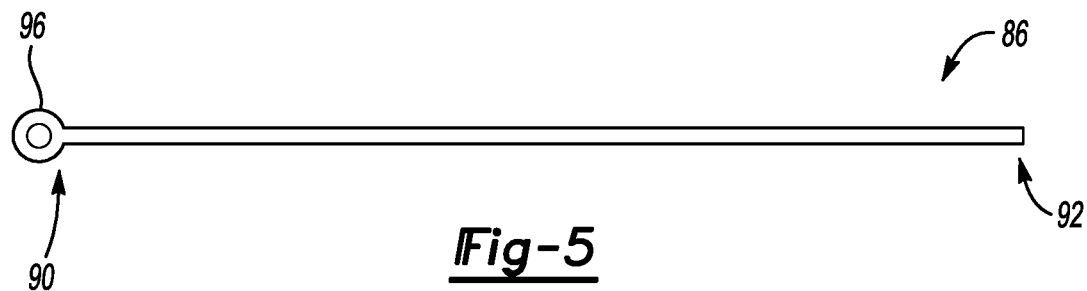
FIG. 5 illustrates a shear cord from the battery pack of FIG. 2.

The shear cord 86 extends longitudinally from a first end portion 90 to a second end portion 92 (see FIG. 5). In this example, when the battery pack 14 is in the assembled state with the shear cord 86, at least some of the first end portion 90 extends outwardly away from the tray 64 and the lid 68 to provide a pull tab 96 having a ring-shape. The remaining portions of the shear cord 86 is at least partially embedded within the seal 82, or between some of the seal 82 and the interior area 70.

In this example, the shear cord 86, other than the pull tab 96, is entirely embedded within the seal 82. Accordingly, at a given longitudinal section through the shear cord 86, the seal 82 extends circumferentially about an entire radially outer perimeter of the shear cord 86 when the battery pack 14 is in the assembled state.

Figure 6:
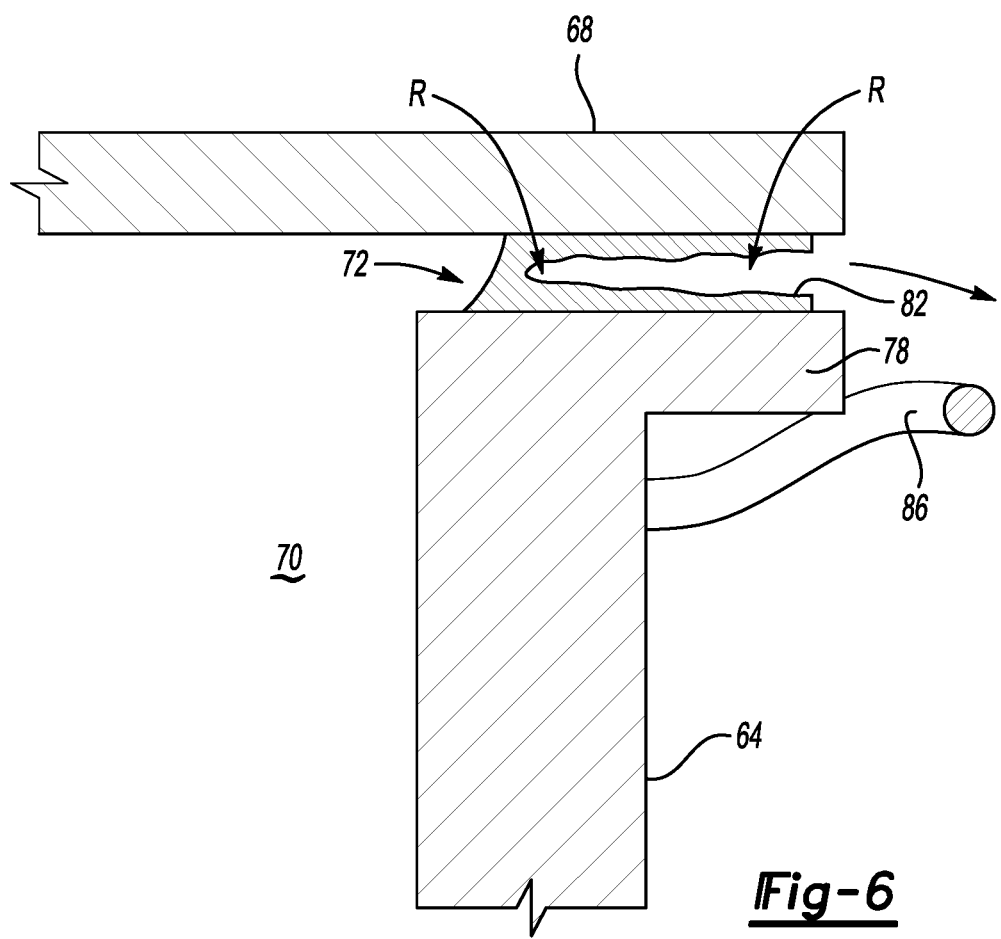
FIG. 6 illustrates the section of FIG. 4 after a seal is ruptured with a shear cord.

An operator desiring to access the interior area 70 can move the shear cord 86 from the position of FIG. 4 to the position of FIG. 6 by pulling the pull tab 96. Moving the shear cord 86 pulls some of the shear cord 86 through the seal 82 to cause a rupture R in at least a portion of the seal 82. With a sufficient portion of the seal 82 ruptured, the lid 68 can be removed from the tray 64. The rupture R continues circumferentially about the opening 74 as the operator continues to pull the pull tab 96.

In the assembled state, the seal 82 at least partially secures the tray 64 to the lid 68. The rupture R reduces the bond between the tray 64 and the lid 68 provided by the seal 82. Reducing the bond permits the tray 64 to move away from the lid 68.

The seal 82 can be, for example, a curable urethane seal. During initial assembly of the battery pack 14, the seal 82 can be applied as a one-part urethane in liquid form. The seal 82 could be extruded to apply the seal 82 to the interface 72. The shear cord 86 can be extruded together with the seal 82. The shear cord 86 could be dipped or coated with the material of the seal 82. The shear cord 86 could instead be dipped or coated with another sealant and then positioned with the seal 82 at the interface 72.

In another example, the seal 82 can be applied to the tray 64, the lid 68, or both, and the shear cord 86 subsequently positioned. Alternatively, the shear cord 86 could be positioned at the interface, and the seal 82 applied afterwards.

The shear cord 86 can be, for example, a braided material or a monolithic material. The shear cord 86 could be polymeric-based and include a high tensile strength fiber reinforcing agent, such as Kevlar®. In some examples, the pull tab 96 of the shear cord 86 is coated, such as through a dipping process, to facilitate sealing where the pull tab 96 exits from the seal 82.

In this example, the shear cord 86 has a circular cross-section. In other examples, the shear cord 86 could have other cross-sections. For example, the shear cord 86 could have a triangular cross-sectional profile with a point of the triangular section directed outward away from the interior area 70 when the battery pack 14 is in the assembled state. Such an orientation could facilitate movement of the shear cord 86 from the first position of FIG. 4 to the second position of FIG. 6 by providing a tapered area to slide the shear cord 86 outward through the seal 82 as the pull tab 96 is pulled.

When the battery pack 14 is installed within a vehicle, the pull tab 96 could be packaged within an area that is relatively inaccessible to prevent inadvertent pull of the pull tab 96, which could inadvertently rupture the seal 82. The pull tab 96 could, with reference to FIG. 2, fold up over the top of the lid 68. The battery pack 14, when secured to an underbody of the vehicle, would trap the pull tab 96 between the lid 68 and an underbody of the vehicle. The pull tab 96 would then be substantially accessible only after the battery pack 14 has been removed from the underbody.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 7:
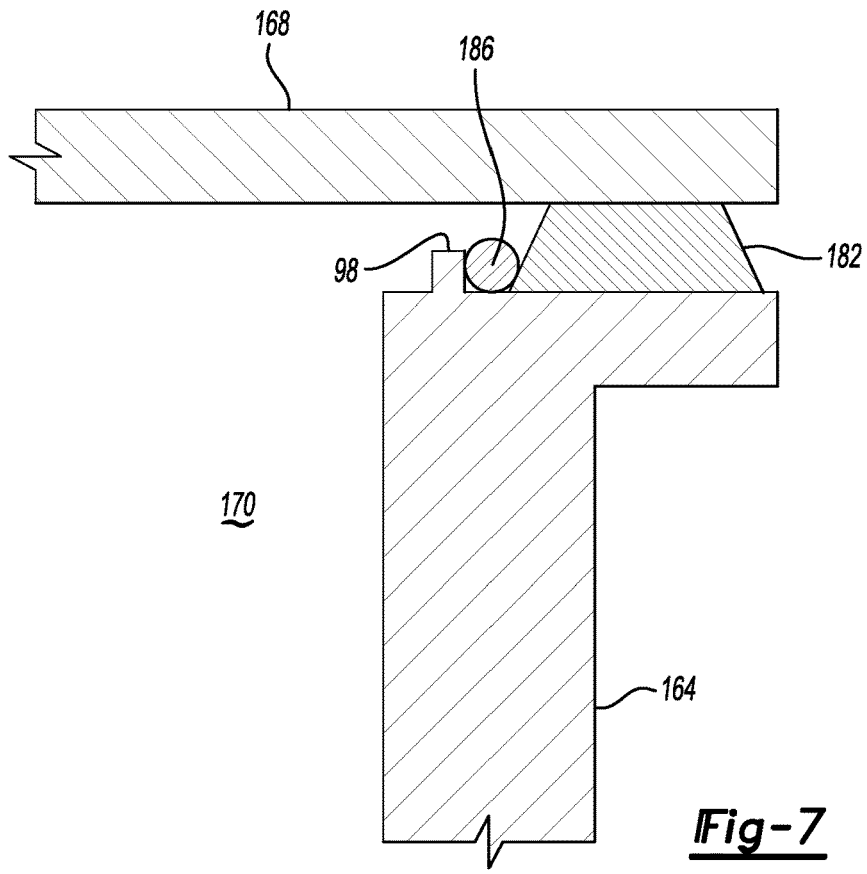
FIG. 7 shows a section view of a seal and a shear cord according to another exemplary embodiment.
Figure 8:
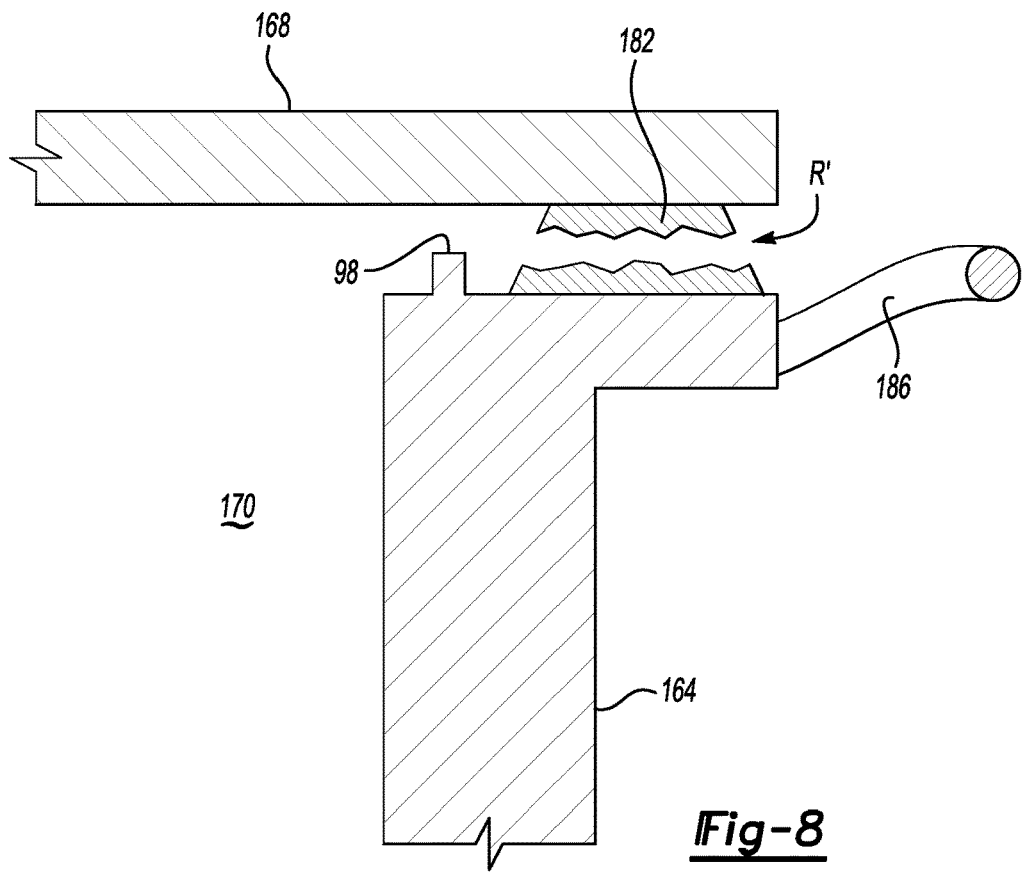
FIG. 8 shows the seal and the shear cord of FIG. 7 after the shear cord has ruptured the seal.

Referring now to FIGS. 7 and 8, in another exemplary embodiment, a shear cord 186 resides within an interior area 170 of a battery pack, but is not necessarily fully embedded within a seal 182. The shear cord 186 could be partially embedded within the seal 182, which can help hold the shear cord 186. The shear cord 186 could instead, or additionally, be held by extensions 98 from the tray 164, for example.

Moving the shear cord 186 from the position of FIG. 7 to the position of FIG. 8 moves the shear cord 186 through the seal 182 to cause a rupture R' such that the seal 182 is separated into at least two separate pieces. When the seal 182 is separated in this way, the seal 182 is not substantially bonding the lid 168 to the tray 164. The lid 168 can then be removed from the tray 164.

Features of the disclose examples include a battery assembly with an enclosure seal that can be ruptured relatively quickly when access to an interior area of the enclosure is required. Removing the enclosure seal with a separate cutting tool is not required. The separate cutting tool could cause damage to components or an undesirable conductive path.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
    an enclosure having a first portion interfacing with a separate, second portion along an interface;
    a seal at the interface, the seal separate from the first portion and the second portion, the seal at least partially disposed between the first portion and the second portion; and
    a shear cord configured to rupture the seal when moved from a first position to a second position, wherein the shear cord and the seal are made of dissimilar materials.

2. The assembly of claim 1, wherein the shear cord is at least partially disposed within the seal, wherein the shear cord is at least partially disposed between the first portion and the second portion.

3. The assembly of claim 1, wherein the seal is a curable seal that joins the first and second portions of the enclosure, wherein a portion of the curable seal bonds the first portion to the second portion after the shear cord has moved to the second position and ruptured the seal.

4. The assembly of claim 1, further comprising at least one battery array housed within the enclosure, the battery array selectively powering propulsion of an electrified vehicle when the seal is bonding the first portion to the second portion.

5. The assembly of claim 4, wherein the first portion is a lid of a traction battery and the second portion is a tray of the traction battery.

6. The assembly of claim 1, wherein the first portion, the second portion, or both are a metal or metal alloy.

7. The assembly of claim 1, wherein a longitudinal section of the shear cord is entirely embedded within the seal such that the seal extends circumferentially about an entire perimeter of the shear cord along the longitudinal section.

8. The assembly of claim 1, wherein the rupture is a partial rupture such that part of the seal remains secured to both the first portion and the second portion when the shear cord is in the second position and when the shear cord has been fully removed from a position where the shear cord is embedded within the seal.

9. A battery accessing method, comprising:
    securing together a first portion and a second portion of an enclosure using a seal; and moving a shear cord from a first position to a second position to rupture the seal, the seal disposed within an interface between the first and the second position of the enclosure when the seal is securing together the first and the second portion of the enclosure, wherein a portion of the shear cord that ruptures the seal is disposed within an interior of the enclosure the portion outside of the seal when the shear cord is in the first position.

10. The method of claim 9, wherein the moving includes pulling a first portion of the shear cord that is outside the enclosure to draw a different, second portion of the shear cord through the seal to rupture the seal.

11. The method of claim 9, further comprising holding at least one battery array within the enclosure, and recharging battery cells of the at least one battery array when the shear cord is in the first position.

12. The method of claim 9, wherein the shear cord is at least partially embedded within the seal when the shear cord is in the first position, and the shear cord is separated from the seal at the interface when the shear cord is in the second position, wherein at least a portion of the seal is directly bonded to the both the first and the second portion of the enclosure when the shear cord is separated from the seal.

13. The method of claim 9, further comprising holding the shear cord with the seal when the shear cord is in the first position, the shear cord and the seal having dissimilar material compositions.

14. The method of claim 9, where the first portion is a lid of a traction battery and the second portion is a tray of the traction battery.

15. The method of claim 9, the rupture is a partial rupture such that part of the seal remains secured to both the first portion and the second portion when the seal is in the second position.

16. The assembly of claim 1, wherein the shear cord is a braided material.

17. The assembly of claim 1, wherein at least a portion of the shear cord is disposed within an interior of the enclosure and is outside of the seal when the shear cord is in the first position.

18. The method of claim 9, wherein the shear cord is a braided material.

* * * * *